United States Patent [19]
Tokubo et al.

[11] Patent Number: 5,145,578
[45] Date of Patent: Sep. 8, 1992

[54] PACKING MATERIAL FOR LIQUID CHROMATOGRAPHY

[75] Inventors: Kazo Tokubo; Michihiro Yamaguchi; Yutaka Ohtsu; Kiyoshi Nakamura; Satoshi Matsumoto, all of Yokohama; Akihiko Yamagishi, Chiba, all of Japan

[73] Assignee: Shiseido Company Ltd., Tokyo, Japan

[21] Appl. No.: 588,519

[22] Filed: Sep. 24, 1990

Related U.S. Application Data

[63] Continuation of Ser. No. 465,557, Jan. 16, 1990, abandoned, which is a continuation of Ser. No. 213,654, Jun. 30, 1988, abandoned.

[30] Foreign Application Priority Data

| Jul. 3, 1987 [JP] | Japan | 62-166622 |
| Oct. 31, 1987 [JP] | Japan | 62-276668 |
| Feb. 8, 1988 [JP] | Japan | 63-26761 |
| Jun. 22, 1988 [JP] | Japan | 63-152110 |

[51] Int. Cl.$^5$ .............................. B01D 15/08
[52] U.S. Cl. ........................ 210/198.2; 210/502.1; 210/656; 502/9; 502/10; 502/62; 502/84
[58] Field of Search ............... 210/635, 656, 198.2, 210/502.1; 502/9, 10, 62, 80, 84

[56] References Cited

U.S. PATENT DOCUMENTS

| Re. 32,503 | 9/1987 | Steenken | 210/502.1 |
| 2,967,158 | 1/1961 | Malone | 502/9 |
| 3,039,973 | 6/1962 | Robinson | 502/9 |
| 3,301,635 | 1/1967 | Bergna | 502/9 |
| 3,433,587 | 3/1969 | Haden | 502/9 |
| 3,515,682 | 6/1970 | Flank | 502/9 |
| 3,663,165 | 5/1972 | Haden | 502/10 |
| 3,782,075 | 1/1974 | Kirkland | 210/198.2 |
| 4,070,283 | 1/1978 | Kirkland | 502/10 |
| 4,089,932 | 5/1978 | Morita | 502/9 |
| 4,104,363 | 8/1978 | Vozka | 502/9 |
| 4,105,426 | 8/1978 | Iler | 201/198.2 |
| 4,107,085 | 8/1978 | Sasaki | 502/9 |
| 4,131,542 | 12/1978 | Bergna | 210/198.2 |
| 4,176,090 | 11/1979 | Vaughan et al. | 252/455 Z |
| 4,271,043 | 6/1981 | Vaughan | 502/84 |
| 4,333,857 | 6/1982 | Lim | 502/9 |
| 4,389,385 | 6/1983 | Ramsay | 210/198.2 |
| 4,404,155 | 9/1983 | Miga et al. | 264/7 |
| 4,418,048 | 11/1983 | Dyer et al. | 423/305 |
| 4,431,546 | 2/1984 | Hughes | 210/502.1 |
| 4,477,492 | 10/1984 | Bergna | 210/198.2 |
| 4,719,191 | 1/1988 | Battiste | 502/84 |

FOREIGN PATENT DOCUMENTS

| 381040 | 8/1986 | Austria | 210/198.2 |
| 1050956 | 3/1979 | Canada | 502/10 |
| 143758 | 9/1980 | Fed. Rep. of Germany | 502/84 |
| 2017072 | 9/1979 | United Kingdom | 210/502.1 |

OTHER PUBLICATIONS

Patent Abstracts of Japan, vol. 11, No. 38 50 C 401, for 61-204138 Feb. 4, 1987.
Patent Abstracts of Japan, vol. 11, No. 35 29 P542 for 61-204562 Feb. 3, 1987.
Derwent Accession No. 86-281 313 Mar. 7, 1985.
Derwent Accession No. 86-281 118 Mar. 7, 1985.
Derwent Accession No. 77-42 355Y May 2, 1977.

*Primary Examiner*—Ernest G. Therkorn
*Attorney, Agent, or Firm*—Sprung Horn Kramer & Woods

[57] ABSTRACT

A packing material for liquid chromatography, comprising a spherical clay mineral powder which comprises a naturally occurring or synthetic water-swellable clay mineral, a clay mineral having foreign cations substantially substituted for interlayer ions inherently present in the naturally occurring or synthetic water-swellable clay mineral, or a calcined product thereof.

7 Claims, 8 Drawing Sheets

PACKING MATERIAL FOR LIQUID CHROMATOGRAPHY

This application is a continuation of application Ser. No. 465,557, filed Jan. 16, 1990, which is a continuation of Ser. No. 213,654, filed Jun. 30, 1988, both now abandoned.

BACKGROUND OF THE INVENTION

1. Field of the Invention

The present invention relates to a packing material for liquid chromatography, comprising a spherical clay mineral powder which comprises a naturally occurring or synthetic water-swellable clay mineral, a water-swellable clay mineral having foreign cations substantially substituted for interlayer ions inherently present therein, or a calcined product thereof.

2. Description of the Related Art

From the viewpoint of the separation mechanism, liquid chromatography is generally classified into adsorption chromatography and partition chromatography, and the latter is further classified into normal phase chromatography and reversed phase chromatography, in view of the combination of the polarity of an eluent and a packing material.

As the packing material for adsorption or normal phase partition chromatography, a packing material based on a porous silica having reticulately distributed macro- and micro-pores is predominantly employed. Further, packing materials based on an alumina or porous polymer such as stylene divinylbenzene or hydroxymethacrylate, or those based on a calcium hydroxide powder or calcium phosphate gel are also used, for limited purposes.

For reversed phase partition chromatography, the packing material having alkyl groups such as an octadecyl group or the like chemically bonded to the above-mentioned packing material such as silica, as a carrier, is widely employed, and a typical example thereof is ODS (octadecylsilane).

With respect to the form of the packing material particle, two types are known, i.e., spherical and irregular particles.

The spherical packing material can be packed at a high density, while ensuring a good reproducibility, and thus exhibits a good column efficiency.

In adsorption and normal phase chromatography, silica gel with a pore size of about 60-100 Å and a specific surface area of about 300-500 m$^2$/g is most widely used. The silica gel has silanol groups (Si-OH) as an active site on the surface, and since an adsorption energy of a functional group in a solute molecule against the silanol groups is an important factor in the separation, such a silica gel is limited in application to non-ionic molecules having a small number of functional groups including oxygen or nitrogen (e.g., carbonyl, hydroxyl, or amino group). Preferably, the silica gel packing material could be applied for solutes having a neutral polarity and an intermediate molecular weight, but it is difficult to apply for an ionic or high polar material.

The porous polymer exhibits a special interaction with the solute molecule, regardless of the kind of the polymer used. The porous polymer packing material has a separation mechanism different from that of the silica gel packing material, and in many cases, the porous polymer packing material can separate solute molecules which are difficult to separate by the silica gel packing material. Nevertheless, the porous polymer packing material has a disadvantage in that the separation efficiency is reduced due to dissolution or swelling of the polymer, and further, the pressure resistance of the porous polymer packing material is inferior to that of the silica gel packing material.

In the silica packing material having alkyl groups bonded to the surface thereof and conventionally used for reversed phase partition liquid chromatography, 10–20% of the silanol groups remain unreacted because of an incomplete reaction between the silanol groups and alkyl chlorosilane. The presence of such residual silanol groups is a serious problem in reversed phase partition liquid chromatography. The residual silanol groups, if any, strongly interact with a polar substance, and thus the analysis or purification of the polar substance results in a wide peak and tailing. Further, a highly polar substance irreversibly adsorbs such residual silanol groups, and thus the function of a column packed with such a conventional material rapidly deteriorates. In addition, the presence of a hydrophilic surface of the silica gel as well as residual silanol groups thereon causes a conventional packed column to become weak against acids and alkalis, and thus limits the pH region of a mobile phase solvent to within 2 to 7.

To solve the problems mentioned above, some conventional packing materials prepared by a reaction with dimethyloctadecylchlorosilane or dimethyloctylchlorosilane have been treated again with trimethylchlorosilane (TMS) or the like, to block the residual silanol groups. But, such a post-treatment with TMS cannot completely avoid the presence of residual silanol groups.

Recently, cases wherein an optical resolution of optical active substances is necessary have increased. As the optical resolution methods, there may be mentioned a method making use of the differences of physicochemical properties of chemically produced diastereomers, a method using an enzyme, a method of chromatography, or the like. In the chromatography method, the differences of both optical antipodes with respect to physical or chemical adsorption, or partitioning against a chiral adsorbent, are used. Thus, the open column method is now disregarded, since recently a high performance liquid chromatography for optical resolution has been developed and used.

In the liquid chromatography for optical resolution, a packing material carrying an optically active ligand adsorbed or chemically bonded to the silica gel or organic polymer powder, or a packing material comprising a polymer having an optical activity has been employed. Further, a method was proposed wherein a resoluting agent of a clay mineral prepared by ion-exchanging interlayer ions thereof for ions from an optically active metallic complex was used.

When the above packing material for optical resolution is used, the substances which can be resoluted are limited, due to the packing material used, and in many cases, the resolution cannot be completed. Further, in many cases it is difficult to use the packing material for a long term, due to a durability problem caused by a desorption of the ligand or a swelling of the packing material.

The metallic complex-clay adduct disclosed in Japanese Unexamined Patent Publication No. 61-204138 does not have a uniform particle size or particle size distribution, or regular shapes of the clay mineral, and thus is difficult to use as the packing material for high performance liquid chromatography. Accordingly, since it can be used only batchwise or in an open column, the resolution is relatively ineffective.

Although the adsorbent prepared by attaching the adduct to the silica gel or the like (Japanese Unexamined Patent Publication No. 61-204562) may be used as the packing material for high performance liquid chromatography, it has a low ratio of the metallic complex-clay adduct (which is necessary for optical resolution) to the total packing material, and thus does not provide many adsorbing sites. Therefore, many substances are eluted without being adsorbed, and thus substances to be applied therefor are extremely limited. If only the few substance which may be applied are used, a disadvantage arises in that it is necessary to add water to the eluent to lower the solubility of the substance in the eluent and increase the adsorption thereof to the packing material.

SUMMARY OF THE INVENTION

After conducting various research projects, the inventors of the present invention found that the above-mentioned problems can be solved by using a packing material for liquid chromatography, comprising a spherical clay mineral powder which comprises a naturally occurring or synthetic water-swellable clay mineral, a clay mineral having foreign cations substantially substituted for interlayer ions inherently present in the naturally occurring or synthetic water-swellable clay mineral, or a calcined product thereof.

Accordingly, the object of the present invention is to provide a packing material for liquid chromatography, comprising a spherical clay mineral powder.

More particularly, the object of the present invention is to provide a packing material wherein the powder comprises a naturally occurring or synthetic water-swellable clay mineral, or a calcined product thereof.

Another object of the present invention is to provide a packing material wherein the powder comprises a clay mineral having foreign cations such as a metallic cation with a one, two or three valency or an organic cation substantially substituted for interlayer ions inherently present in the naturally occurring or synthetic water-swellable clay mineral, or a calcined product thereof.

Still another object of the present invention is to provide a packing material wherein the powder comprises a clay mineral having foreign cations such as an optically active cation substantially substituted for interlayer ions inherently present in the naturally occurring or synthetic clay mineral.

Other objects and advantages of the present invention will be apparent from the following description.

BRIEF DESCRIPTION OF THE DRAWINGS

in FIGS. 7, 8 and 9, wherein the peak 1 denotes naphthalene, and the peak 2 denotes anthracene;

DESCRIPTION OF THE PREFERRED EMBODIMENTS

Figure 1:
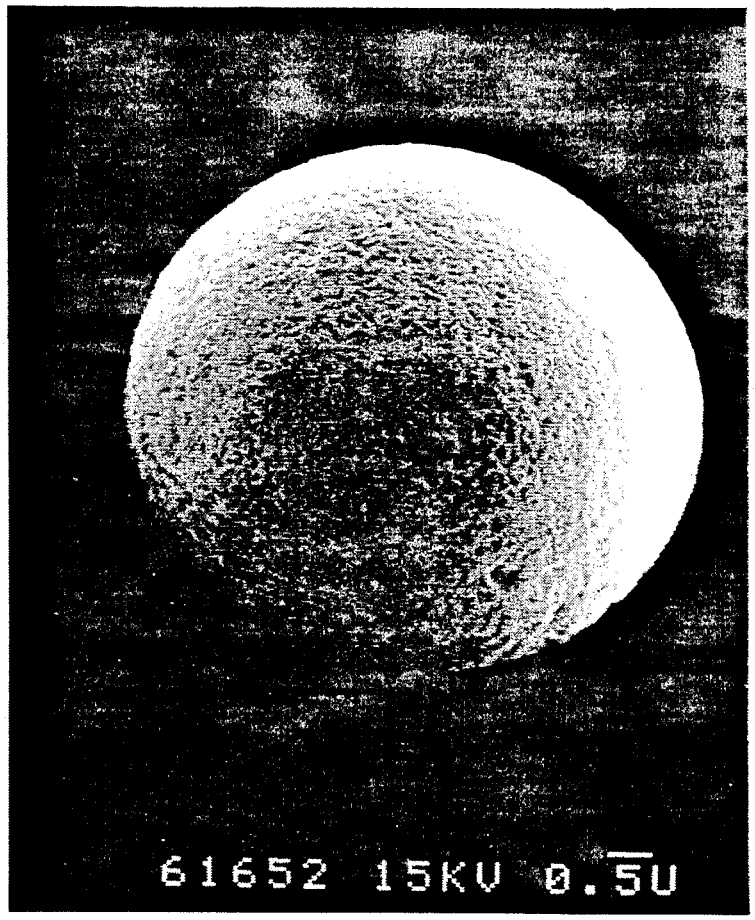
FIG. 1 is a scanning electron microscope photograph (×10,000) showing the crystalline structure of the spherical clay mineral powder obtained in Example 1 and used in the present invention.

The water-swellable clay mineral which may be used in the present invention is preferably a layered silicate mineral belonging to smectites, such as montmorillonite, beidellite, nontronite, saponite, hectonite or the like, but any water-swellable clay mineral can be used in the present invention, so long as a spherical clay mineral can be formed therefrom. The water-swellable clay mineral may be naturally occurring or synthetic. For example, Kunipia (Kunimine Kogyo), Smecton (Kunimine Kogyo), Veegum (RT. Vanderbilt), Laponite (Laporte Industries, Ltd.), fluoro-tetrasilicic mica (Topy Kogyo), or the like may be used. In the present invention, one or more water-swellable clay minerals are selected for use.

In this specification, "water-swellable" clay mineral means a layered silicate mineral which becomes a uniform gel.

For the packing material for chromatography, a powder having a larger specific surface area, and thus a larger adsorption capacity is preferable, because this allows a stronger retention of the solute molecules. Accordingly, preferably a synthetic water-swellable clay mineral, for example, Smecton, which is a synthetic saponite, or Laponite, which is a synthetic hectorite, is used.

The water-swellable clay mineral exhibits special interactions with various polar molecules at the surfaces of the powder and between layers. Therefore, the selectively of the packing material comprising the water-swellable clay mineral against the solute molecules is different from those of the conventional silica gel packing material. Thus, the present invention provides a new type of the packing material.

In the packing material for liquid chromatography, the column efficiency is more improved, as a degree of spherical form becomes more complete. The packing material according to the present invention is characterized by the spherical form.

The spherical clay mineral powder used in the present invention can be most simply prepared by the spray drying method, whereby a spherical powder with regular particle forms and particles size can be obtained.

More particularly, it is a method in which a water-swellable clay mineral, preferably such a mineral with a specific surface area of 100 m²/g or more, is dispersed in an aqueous medium to be gelled, and then the dispersion is spray dried. The term "specific surface area" as used in the present specification is a BET method value determined from the nitrogen adsorption amount at the liquid nitrogen temperature, and in water-swellable clay mineral, refers to the value corresponding to the outer surface area including the end surfaces, because no nitrogen molecule has penetrated between the layers at the liquid nitrogen temperature.

In the preparation of the above gel, it is desirably to control the concentration of the water-swellable clay mineral to not higher than 20% by weight, particularly desirably, 1 to 10% by weight. At a concentration exceeding 20% by weight, the gel viscosity is higher, whereby delivery of the liquid to a spraying nozzle at the time of spray drying is very difficult, and clogging of the nozzle, etc. may occur.

Also, during the preparation of the above gel, preferably stirring is performed until the water-swellable clay mineral is sufficiently dispersed and swollen. In the case of insufficient dispersion and swelling, clogging of nozzle during spray drying may occur, or in some case, the spherical clay mineral may become undesirably irregular.

During spray drying, spray drying methods in general such as disc type, pressure nozzle system, 2-fluid nozzle system, etc. can be applied. In each case, the inlet air temperature during spraying can be set at a broad temperature range of about 150° to 300° C. This is because the clay mineral is thermally stable at least about 300° C. Also, the exhaust temperature may be defined depending on the spray flow rate from the nozzle, etc., but may be around approximately 100° C. Generally, the resulting spherical clay mineral may have a particle size of 2 to 30 μm. Also, the shape of the particle becomes spherical and the surface of the particle becomes uniform and smooth, as the appearance of the above gel is more transparent.

The spherical clay mineral obtained as described above is then calcined, if desired. The calcination temperature, the calcination time and the atmosphere for calcination may be selected depending on the clay mineral used or the solute molecule to be separated, but the calcination temperature must not be higher than the temperature at which mutual sintering occurs between the spherical clay minerals. This temperature is about 900° C. or higher. At a calcination temperature range lower than that temperature, a change in crystalline structure by X-ray diffraction measurement may sometimes occur, but this is not a problem if the shape remains spherical. The particle size will not be substantially changed by calcination. By such calcination, the water absorptivity of the spherical powder is reduced and further the water-swellability is lost, thus having a remarkable specific feature that no gel is formed but the spherical shape is maintained even when dispersed in water.

The resulting spherical clay mineral powder with or without the subsequent calcination can be subjected to dry classification and employed as the packing material for liquid chromatography.

The resulting spherical clay mineral powder exhibits special interactions with the solute molecules on the surface on the powder or between layers. Therefore, the molecules which are difficult to be separated by the conventional silica gel packing material can be separated by the present packing material. Further, the spherical clay mineral powder can provide the packing material having a good column efficiency for liquid chromatography, because of the spherical form thereof.

Between the layers of the water-swellable clay mineral, there are generally cations such as sodium, lithium, or the like which electrically neutralizes the water-swellable clay mineral as a whole. Those cations are exchangeable and may easily be substituted by other cations. A capacity for exchanging cations varies with the kind of the water-swellable clay mineral used, but generally ranges from 60 to 150 miliequivalents per 100 g of the clay mineral. The clay mineral wherein the cations inherently present therein are replaced by foreign cations such as metallic or organic cations loses its water-swellability, and does not form a gel, but exists as powder when brought into contact with water. The spherical clay mineral powder prepared only by spray drying as mentioned above swells in water, and thus is not satisfactory as the packing material. The clay mineral wherein the interlayer cations are substituted with foreign cations can be used as the packing material without water-swellability. Such a packing material may be used for adsorption, or normal phase or reversed phase partition chromatography. The clay mineral having interlayer organic cations brings about more hydrophobic packing material which is particularly suitable for reversed phase partition chromatography.

Accordingly, the present invention also relates to a packing material for liquid chromatography, comprising the spherical clay mineral powder which comprises a clay mineral having foreign cations substantially substituted for interlayer ions inherently present therein.

The term "foreign cation" used herein means cations which are not inherently present in the original water-swellable clay mineral, but incorporated by exchanging interlayer cations inherently present therein for other cations.

As the foreign cations, there may be used a metallic cation, such as a cation of a monovalent metal (e.g., silver, rubidium, cesium, etc.), a divalent metal (e.g., calcium, copper, zinc, cobalt, cadmium, nickel, etc.), or a trivalent metal (e.g., alminium, iron, ruthenium, etc.), or an organic cation such as a quaternary ammonium salt (e.g., benzyl dimethyl stearyl ammonium chloride, dimethyl distearyl ammonium chloride, trimethyl stearyl ammonium chloride, etc.).

The water-swellable clay mineral exhibits special interactions with various polar molecules at the surfaces of the powder and between layers. Therefore, the selectivity of the packing material comprising the water-swellable clay mineral against the solute molecules is different from those of the conventional silica gel packing material for adsorption or normal phase partition chromatography or of the conventional packing material having alkyl groups for reversed phase partition chromatography. Thus, the present invention provides a new type of the packing material. Further, because the surface of the silica is generally acidic, the silica selectively adsorbs basic substances. Such an adsorption causes a tailing of the peak. To the contrary, the surface of the clay mineral is basic and can obtain a sharp peak of the basic substance.

In the packing material for liquid chromatography, the column efficiency is more improved, as a degree of spherical form becomes more complete. The packing material according to the present invention is characterized by the spherical form.

The spherical clay mineral powder comprising the clay mineral with the foreign cations can be simply prepared by the spray drying as mentioned above to obtain the spherical water-swellable clay mineral powder, and a subsequent exchange of interlayer cations for the foreign cations.

The exchange of the interlayer cations may be carried out by dissolving a salt of the foreign cation in an aqueous or organic solvent, dispersing the spherical water-swellable clay mineral powder therein, and stirring the whole. Thereafter, the clay mineral powder is separated, washed and dried to obtain a desired product.

As the salt of the foreign cation, any salt soluble in the aqueous or organic solvent (e.g., chloride, nitrate, sulfate or the like) may be used. Any aqueous or organic solvent commonly used, such as water, ethanol, methanol or acetone may be used as the aqueous or organic solvent.

The concentration of the water-swellable clay mineral in the aqueous or organic solvent is not limited. However, at a concentration exceeding 20% by weight, the stirring operation becomes difficult, whereby the ion exchange becomes difficult. Preferably, the amount of the foreign cations in the dispersion is more than the cation exchange capacity of the water-swellable clay mineral. The dispersion for carrying out the ion exchange may have any temperature. In general, a room temperature is sufficient. The drying may be performed at any temperature below the decomposition temperature of the foreign cations.

The spherical clay mineral powder obtained as described above is then calcined, if desired. The calcination temperature, the calcination time and the atmosphere for calcination may be selected depending on the clay mineral used or the solute molecule to be separated, but the calcination temperature must not be higher than the temperature at which mutual sintering occurs between the spherical clay minerals. This temperature is about 900° C. or higher. When the foreign ion is the metallic ion, a solvent resistance can be improved by the calcination.

It can be confirmed if the interlayer ions are substantially exchanged for the foreign cations in the clay mineral powder. In the case of the metallic cations, the amount of the exchanged cations can easily be determined by an elementary analysis using atomic absorption or the like. In the case of the organic cations, spaces between layers are compared by an X-ray diffraction method, before and after the exchanging treatment. The exchange can be confirmed by an enlargement of the spaces.

The resulting spherical clay mineral powder having the foreign cations with or without the subsequent calcination can be subjected to the conventional dry classification and employed as the packing material for liquid chromatography.

In the packing material comprising the clay mineral powder with the foreign cations, there is little influence of the silanol groups on the surface thereof, as opposed to the conventional packing material using the silica as a carrier. Therefore, a sharp peak can be obtained for basic or polar molecules. Further, various separation characteristics can be achieved by the foreign cations exchanged. For the elution of such basic or polar molecules, widely various eluents may be used. The packing material having a good column efficiency for liquid chromatography can be obtained, by virtue of the spherical form.

When an optically active cations are introduced as the foreign cations, the packing material capable for the effective optical resolution of the optically active substances and employment for a long term can be obtained.

As the optically active cation, there may be used a metallic complex, amino acid, quaternary ammonium salt, alkaloid or the like which has an optically active site. The optically active metallic complex is particularly preferable.

Any metallic complex which comprises the metallic ion and ligands, is inactive against the replacement of the ligands, and has an optical activity due to the coordination structure, may be employed in the present invention. Of those metallic complexes, it is preferable to use the metallic complex, the optical resolution of which is easy, which is stable during using without racemization and change of properties, and the optically active substance of which has a high resolution ability. As the metallic ion, nickel, ruthenium, cobalt, iron, copper or the like may be used. The ligand generally used, for example, 1,10-phenanthroline, 2,2'-bipyridine, amino acids or the like may be employed.

The spherical clay mineral powder comprising the clay mineral with the optically active cations as the foreign cations can be simply prepared by the spray drying as mentioned above to obtain the spherical water-swellable clay mineral powder, and a subsequent exchange of interlayer cations for the optically active cations as the foreign cations.

The exchange of the interlayer cations may be carried out by dissolving a salt of the foreign cation in water or an organic solvent, dispersing the spherical water-swellable clay mineral powder therein, and stirring the whole. Alternatively, the spherical water-swellable clay mineral powder is dispersed in the organic solvent, and then the salt of the optically active cation is dissolved therein. Thereafter, the clay mineral powder is separated, washed and dried to obtain a desired product. Any organic solvent commonly used, such as ethanol, methanol or acetone may be used as the organic solvent.

The concentration of the water-swellable clay mineral in the organic solvent is not limited. However, at a concentration exceeding 20% by weight, the stirring operation becomes difficult, whereby the ion exchange becomes difficult. Preferably, the amount of the optically active foreign cations in the dispersion is more than the cation exchange capacity of the water-swellable clay mineral. The dispersion for carrying out the ion exchange may have any temperature. In general, a room temperature is sufficient. The drying may be performed at any temperature below the decomposition temperature of the optically active foreign cations.

Any optically active substance soluble in a solvent can be subjected the optical resolution by the packing material comprising the spherical clay mineral powder with the optically active foreign cations. As examples of the optically active substances, there may be mentioned various organic compounds having one or more asymmetric carbon atom, such as amino acids, compounds having one or more axial chirality, such as 1,1'-bi-2-naphthol, 2,2'-diamino-1,1'-binaphthyl or the like, compounds having one or more asymmetrically central hetro atom, such as phenylcyclohexyl sulfoxide, condensed aromatic compound such as hexahelicene, metallic complexes such as tris(acetylacetonate)cobalt (III).

As the eluent, a polar solvent such as water, methanol or ethanol, a non-polar solvent such as chloroform, or a mixture thereof may be widely used. When those eluent is used, the cations are not eluted, and thus the packing material according to the present invention may be used for a long term.

Because the packing material according to the present invention is characterized by the spherical form, it can provide a good packing efficiency, be used for high performance liquid chromatography, and achieve an excellent number of theoretical plates. The packing material according to the present invention does not include the carrier, but substantially, comprises clay minerals. Therefore, it has a high density of the sites capable of distinguishing, for example, the optical isomers, and an extremely high capability of distinguishing the optical isomers. Further, any eluents may be used, and the separation, including the optical resolution, of widely various substances may be performed.

The spherical clay mineral powder comprising the spray-dried water-swellable clay mineral can be prepared simply and cheaply. Further, many cations, including the optically active cations such as the metallic complexes which may be easily obtained by synthesis or optical resolution, are known. Therefore, the packing material comprising the spherical clay mineral powder even with the foreign cations including the optically active cations can be obtained easily and cheaply. Accordingly, the packing material according to the present invention is very useful for an analysis or separation of various substances, particularly optically active isomers having physiological activities.

EXAMPLES

The present invention is described in more detail below by referring to Examples, but of course, the scope of the present invention is not limited to these Examples.

EXAMPLE 1

In 10 l of water, 300 g of Laponite XLG (specific surface area: 330 $m^2/g$) was dispersed while stirring, and the obtained gel was spray dried by a disc spray drying tester at a disc rotational number of 20,000 rpm, an inlet air temperature of about 200° C. and an exhaust temperature of 110° C. As a result, 240 g of spherical powder of 2 to 30 $\mu m$ was obtained. FIG. 1 shows a scanning electron microscope photograph of this product.

Using a dry classifier (TURBO CLASSIFIER TC-15N: manufactured by Nissin Engineering K.K.), the spherical clay mineral thus obtained was classified to obtain 60 g of spherical powder of 5-10 $\mu m$.

Five grams of the resulting powders were packed into a stainless steel column having an inner diameter of 4.6 mm and a length of 25 cm, using a packer and a pump, by an equilibrium slurry packing method, to prepare a packed column.

Figure 2:
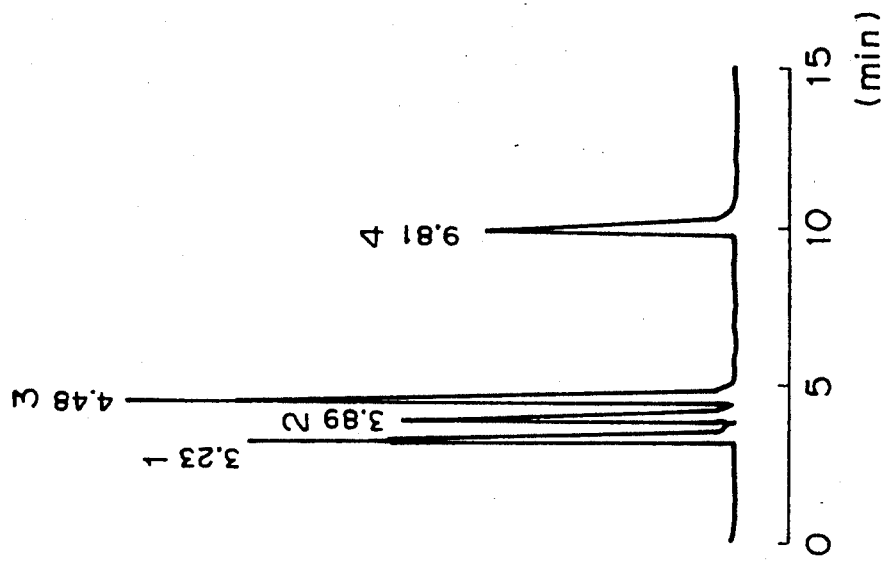
FIGS. 2 and 6 show chromatograms resulting from analyses of toluene, methyl benzoate, nitrobenzene and aniline, using the packing materials obtained in Examples 1 and 3 according to the present invention, respectively.

The resulting column was connected to a high performance liquid chromatograph, and a mixture of n-hexane and ethanol (90:10) was run therethrough as a mobile phase at a rate of 1 ml/min. A standard mixture containing toluene, methyl benzoate, nitrobenzene, and aniline (selected as representatives of hydrocarbon compound, ester, nitro compound, and amino compound) was poured, and the absorptions were measured at 280 nm by an ultraviolet (UV) absorptiometer to obtain a chromatogram. The result is shown in FIG. 2. It is apparent from FIG. 2 that the above substances were effectively separated.

COMPARATIVE EXAMPLE 1

Figure 3:
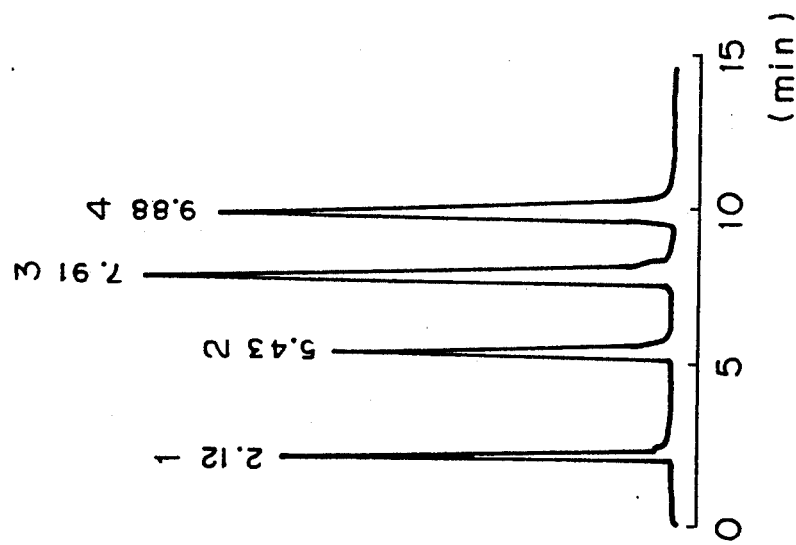
FIG. 3 shows a chromatogram resulting from an analysis of toluene, methyl benzoate, nitrobenzene and aniline, using a column packed with commercially available silica gel (fine pore size of 60 Å; particle size of 5 μm), in FIGS. 2, 3 and 6, wherein the peak 1 denotes toluene, the peak 2 denotes methyl benzoate, the peak 3 denotes nitrobenzene, and the peak 4 denotes aniline.

The procedure described in Example 1 was repeated, except that a commercially available column packed with silica gel (fine pore: 60 Å, particle size: 5 $\mu m$) was used. FIG. 3 shows the resulting chromatogram. There is little hydrogen bond between the silica surface with toluene, methyl benzoate or nitrobenzene, and thus they have similar short retention times and separation thereof is not good. The hydrogen bond is formed between the silica surface with aniline, and thus aniline has a longer retention time.

A comparison of FIGS. 2 and 3 shows that the separation by the packing material of the present invention is superior to that of the conventional silica gel packing material

EXAMPLE 2

Figure 4:
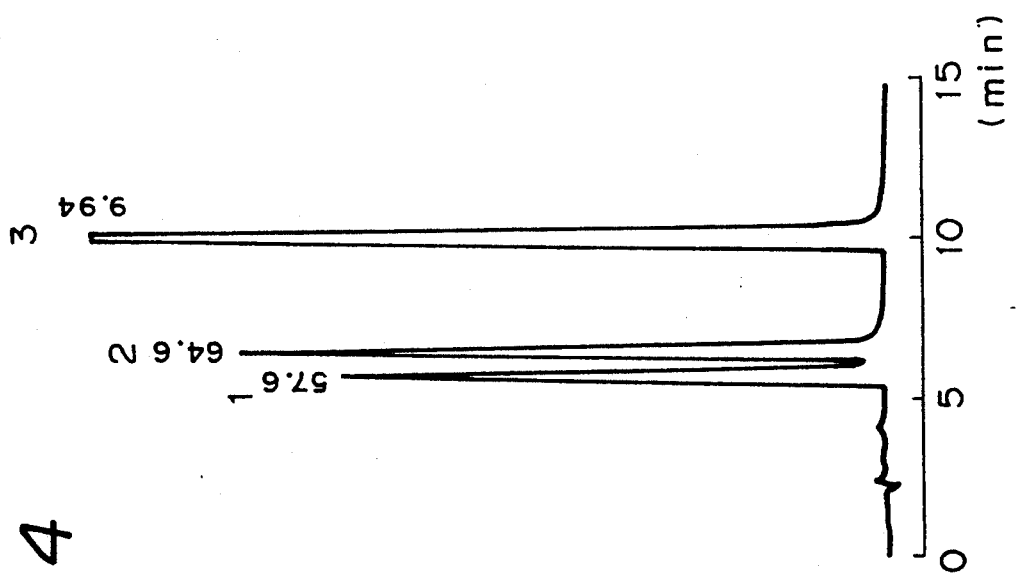
FIG. 4 shows a chromatogram resulting from an analysis of aniline, p-ethylaniline, and p-butylaniline, using the packing material obtained in Example 1 according to the present invention.

A standard mixture consisting of aniline, p-ethylaniline and p-butylaniline was analyzed using the column obtained in Example 1 under the same conditions as in Example 1. The resulting chromatogram is shown in FIG. 4. The packing material of the present invention can effectively separate unsubstituted aniline and alkyl-substituted anilines having a similar hydrogen bonding strength.

COMPARATIVE EXAMPLE 2

Figure 5:
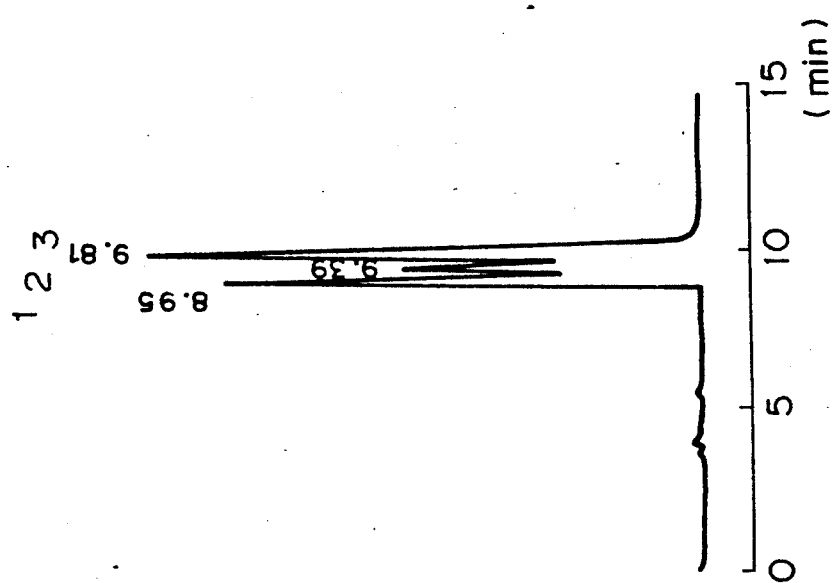
FIG. 5 shows a chromatogram resulting from an analysis of aniline, p-ethylaniline and p-butylaniline, using a column packed with commercially available silica gel (fine pore size of 60 Å; particle size of 5 μm), in FIGS. 4 and 5, wherein the peak 1 denotes p-butylaniline, the peak 2 denotes p-ethylaniline, and the peak 3 denotes aniline.

The procedure described in Example 2 was repeated, except that a commercially available column packed with silica gal (fine pore: 60Å, particle size: 5 $\mu m$) was used. FIG. 5 shows the resulting chromatogram. It is apparent from FIG. 5 that use of the conventional silica gel packing material results in a poor separation.

A comparison of FIGS. 4 and 5 shows that the separation by the packing material of the present invention is superior to that of the conventional silica gel packing material.

EXAMPLE 3

In 500 ml of ethanol was dissolved 2.21 g of calcium chloride (dihydrate), and then 10 g of classified spherical clay mineral powder obtained in Example 1 was dispered therein. After stirring for 4 hours, the powder was filtered off, washed with water, and then dried at 80° C. to obtain the spherical powder. The amount of calcium contained in the resulting spherical powder was 2.2% by weight (determined by atomic absorption). This means that 100% of the cations originally present were exchanged for calcium cations.

Five grams of the resulting powders were packed into a stainless steel column having an inner diameter of 4.6 mm and a length of 25 cm, using a packer and a pump, by an equilibrium slurry packing method, to prepare a packed column.

Figure 6:
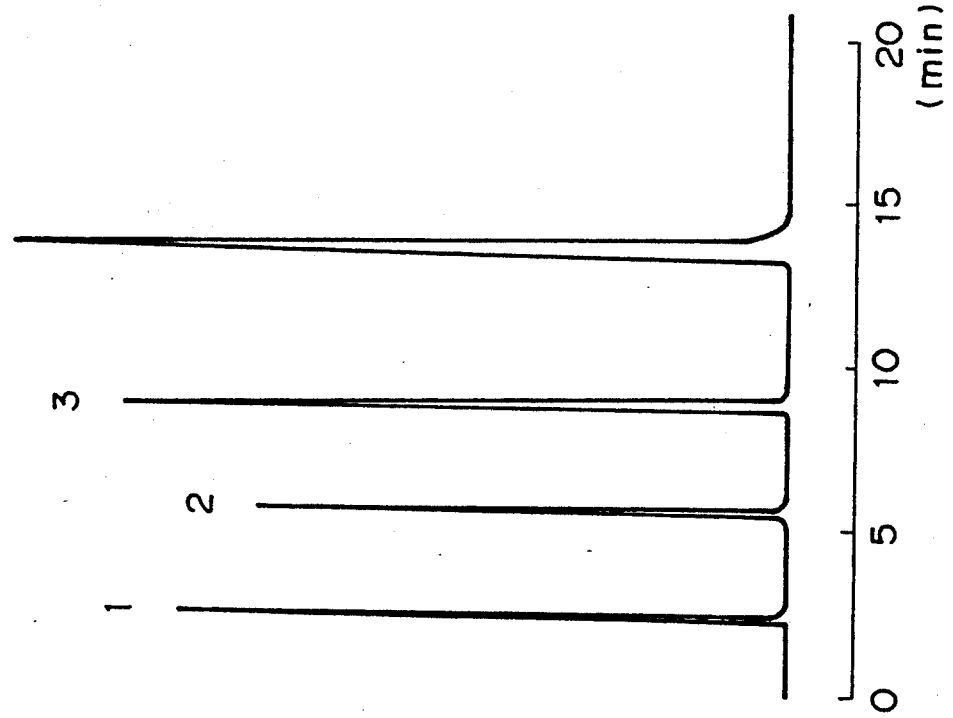

The resulting column was connected to a high performance liquid chromatograph, and a mixture of n-hexane and ethanol (90:10) was run therethrough as a mobile phase at a rate of 1 ml/min. A standard mixture containing toluene, methyl benzoate, nitrobenzene, and aniline (selected as representatives of hydrocarbon compound, ester, nitro compound and amino compound) was poured, and the absorptions were measured at 280 nm by an ultraviolet (UV) absorptiometer to obtain a chromatogram. The result is shown in FIG. 6. It is apparent from FIG. 6 that the above substances were effectively separated.

EXAMPLE 4

In 500 ml of ethanol was dissolved 4.87 g of ferric chloride (anhydrous) and then 10 g of the spherical clay mineral obtained in Example 1 was dispersed therein. After stirring for 4 hours, the powder was filtered off, washed with water, dried at 80° C., and then calcined at 500° C. for 4 hours.

The resulting powder was packed into column to prepare a packed column, as in Example 3.

Figure 7:
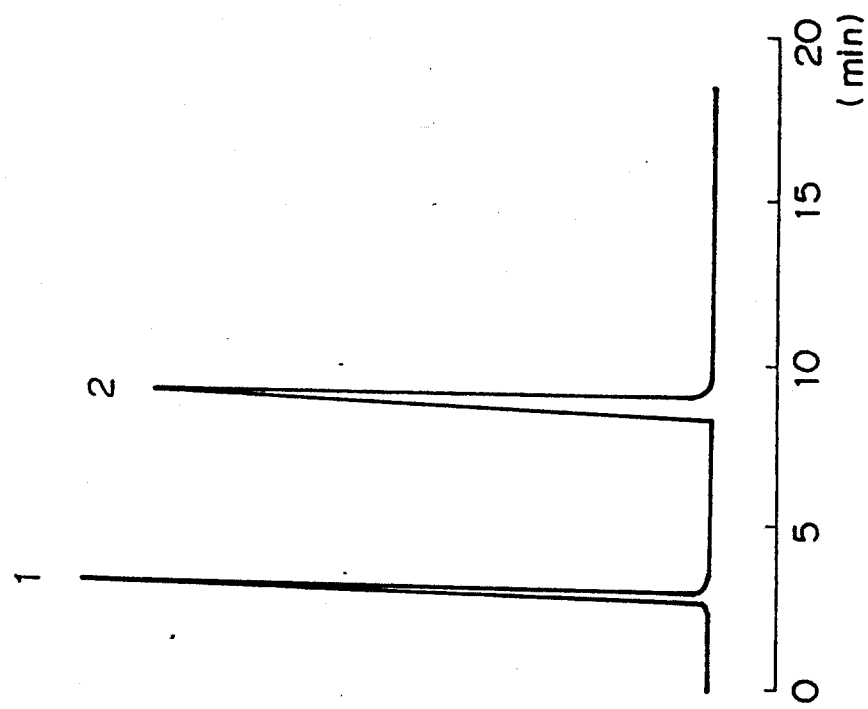
FIGS. 7 and 8 show chromatograms resulting from analyses of naphthalene and anthracene, using the packing material obtained in Examples 4 and 5 according to the present invention, respectively.

The resulting column was connected to a high performance liquid chromatograph, and a mixture of water and methanol (20:80) was run therethrough as a mobile phase at a rate of 1 ml/min. A mixture of naphthalene and anthracene was poured, and the absorptions were measured at 254 nm by an ultraviolet (UV) absorptiometer to obtain a chromatogram. The result is shown in FIG. 7. It is apparent from FIG. 7 that the above substances were effectively separated.

EXAMPLE 5

In 500 ml of ethanol was dissolved 10.44 g of trimethyl monostearyl ammonium chloride, and then 10 g of classified spherical clay mineral powder obtained in Example 1 was dispered therein. After stirring for 4 hours, the powder was filtered off, washed with water, and then dried at 80° C. to obtain the spherical powder. The spaces between layer of the resulting powder were measured by an X-ray diffraction method, and it was found that the spaces thereof were enlarged by about 3 Å in comparison with those of the powder obtained in Example 1. This means that the interlayer ions were exchanged for trimethyl monostearyl ammonium chloride.

The resulting powder was packed into a column to prepare a packed column, as in Example 3.

Figure 8:
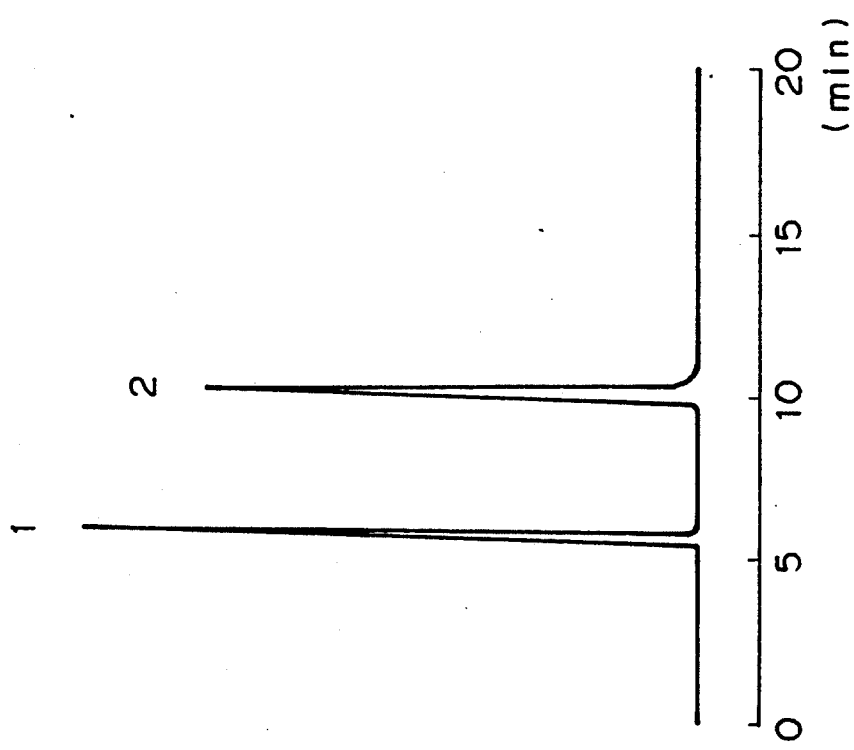

The resulting column was connected to a high performance liquid chromatograph and methanol was run therethrough as a mobile phase at a rate of 1 ml/min. A mixture of naphthalene and anthracene was poured, and the absorptions were measured at 254 nm by an ultraviolet (UV) absorptiometer to obtain a chromatogram. The result is shown in FIG. 8. It is apparent from FIG. 8 that the above substances were effectively separated.

COMPARATIVE EXAMPLE 3

Figure 9:
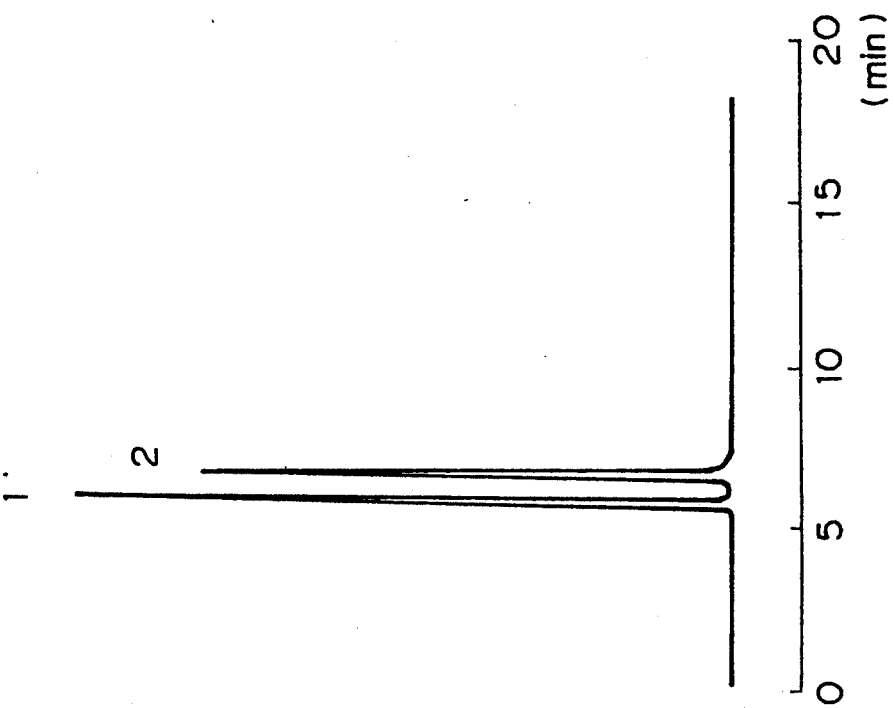
FIG. 9 shows a chromatogram resulting from an analysis of naphthalene and anthracene, using a column packed with commercially available ODS-silica gel.

The procedure described in Example 5 was repeated, except that a commercially available column packed with ODS-silica gel was used. FIG. 9 shows the resulting chromatogram.

A comparison of FIGS. 8 and 9 shows that the separation by the packing material of the present invention is superior to that of the conventional silica gel packing material.

EXAMPLE 6

In 500 ml of ethanol was dissolved 17.60 g of dimethyl distearyl ammonium chloride, and then 10 g of classified spherical clay mineral powder obtained in Example 1 was dispered therein. After stirring for 4 hours, the powder was filtered off, washed with water, and then dried at 80° C. to obtain the spherical powder.

The resulting powder was packed into a column to prepare a packed column, as in Example 3.

Figure 10:
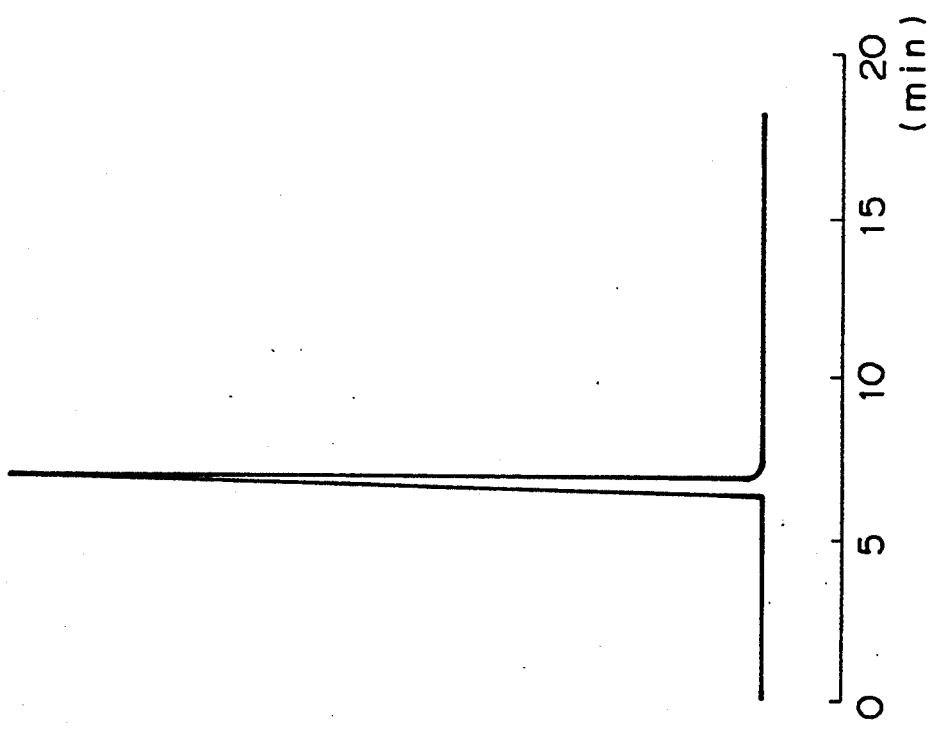
FIG. 10 shows a chromatogram resulting from an analysis of adenine, using the packing material obtained in Example 6 according to the present invention.

The resulting column was connected to a high performance liquid chromatograph, and water was run therethrough as a mobile phase at a rate of 1 ml/min. Adenine (nucleic acid) was poured, and the absorption was measured at 260 nm by an ultraviolet (UV) absorptiometer to obtain a chromatogram. The result is shown in FIG. 10. It is apparent from FIG. 10 that the above substance was clearly detected.

COMPARATIVE EXAMPLE 4

Figure 11:
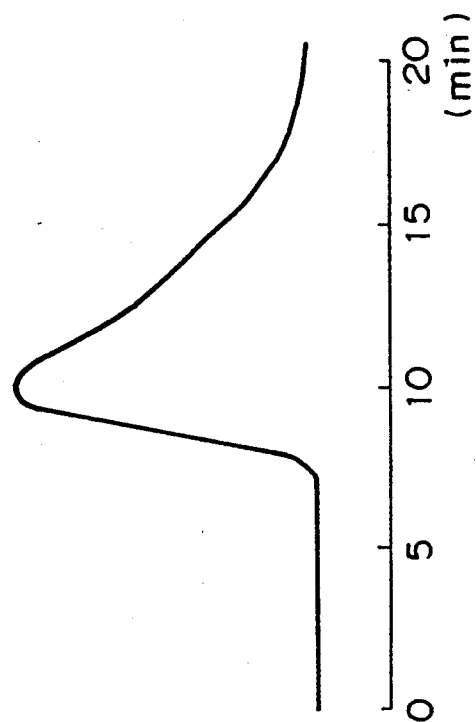
FIG. 11 shows a chromatogram resulting from an analysis of adenine, using the column packed with commercially available ODS-silica gel.

The procedure described in Example 6 was repeated, except that a commercially available column packed with ODS-silica gel was used. FIG. 11 shows the resulting chromatogram. Due to an interaction between the basis substance (adenine) with the silanol groups remaining on the surface of the ODS-silica gel packing material, tailing of the peak appeared. A comparison of FIGS. 10 and 11 shows that the packing material of the present invention is superior to the conventional silica gel packing material, with respect to the separation of the basic substance.

EXAMPLE 7

In 500 ml of ethanol was dissolved 1.7 g of silver nitrate, and then 10 g of classified spherical clay mineral powder obtained in Example 1 was dispersed therein. After stirring for 4 hours, the powder was filtered off, washed with water, and then dried at 80° C. to obtain the spherical powder. The resulting powder was packed into a column to prepare a packed column, as in Example 3.

Figure 12:
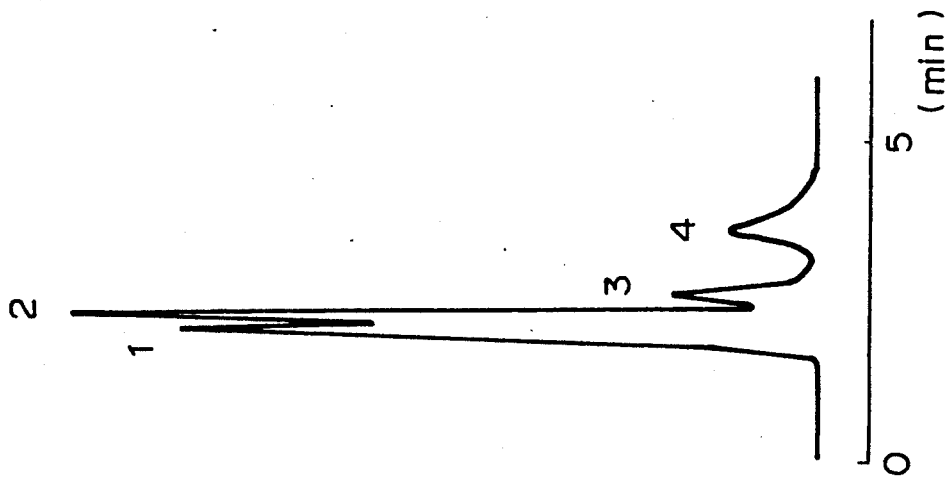
FIG. 12 shows a chromatogram resulting from an analysis of a mixture of ethyl esters of various fatty acids (palmitic, oleic, linoleic, and γ-linolenic acids), using the packing material obtained in Example 7 according to the present invention, wherein the peak 1 denotes ethyl palmate, the peak 2 denotes ethyl oleate, the peak 3 denotes ethyl linoleate, and the peak 4 denotes ethyl γ-linolenate.

The resulting column was connected to a high performance liquid chromatograph, and acetone was run therethrough as a mobile phase at a rate of 1 ml/min, and a mixture of ethyl esters of four fatty acids (palmitic, oleic, linoleic, and γ-linolenic acids) was poured. A chromatogram obtained by an RI detector is shown in FIG. 12, and it is apparent therefrom that the packing material of the present invention is suitable for the separation of the substances having different degrees of unsaturation.

EXAMPLE 8

In 10 l of water, 300 g of Laponite XLG was dispersed while stirring, and the obtained gel was spray dried by a disc spray drying tester at a disc rotational number of 20,000 rpm, an inlet air temperature of about 200° C. and an exhaust temperature of 110° C. As a result, 240 g of spherical powder of 2 to 20 μm was obtained.

Using a dry classifier (TURBO CLASSIFIER TC-15N; manufactured by Nissin Engineering K.K.), the spherical clay mineral thus obtained was classified to obtain 60 g of spherical powder of 3–7 μm.

In 500 ml of ethanol was dissolved 5 mmole of Δ-Ni(Phen)$_3^{2+}$Cl$_2$ (wherein Phen denotes 1,10-phenanthroline), and then 10 g of classified spherical clay mineral powder obtained as above was dispersed therein. After stirring for 4 hours, the powder was filtered off, washed with water, and then dried at 80° C. to obtain the spherical powder.

The resulting powder was packed into a column to prepare a packed column as in Example 3.

Figure 13:
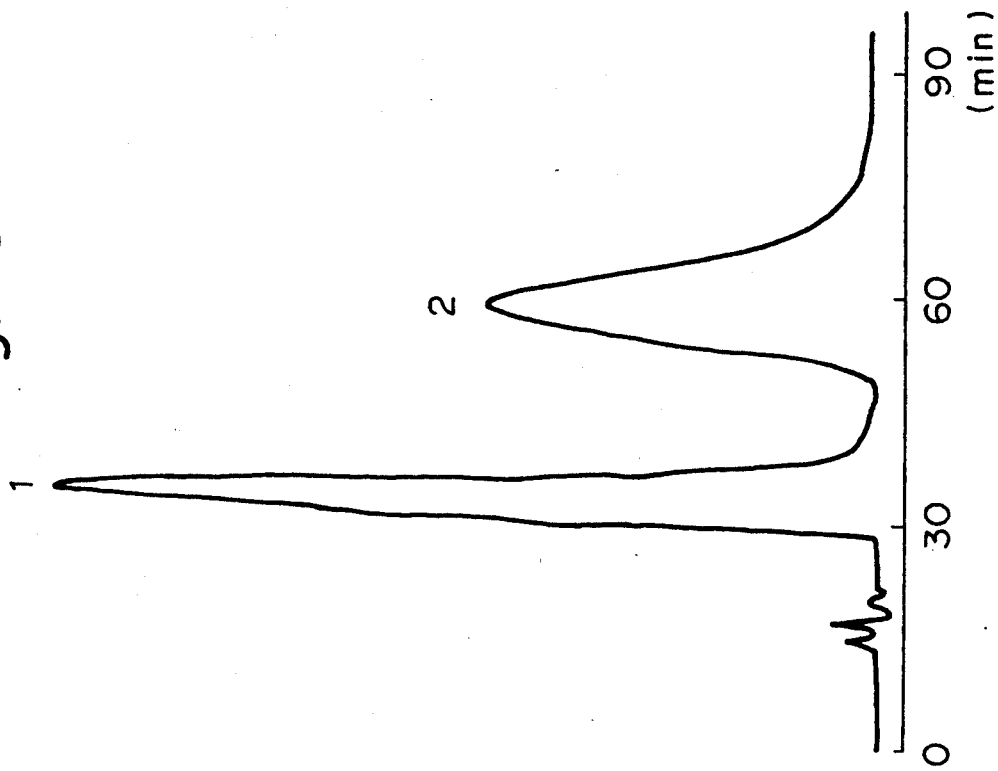
FIG. 13 shows a chromatogram resulting from an analysis of racemic compound of 1,1'-bi-2-naphthol, using the packing material obtained in Example 8 according to the present invention, wherein the peak 1 denotes (S)-1,1'-bi-2-naphthol and the peak 2 denotes (R)-1,1'-bi-2-naphthol; and, FIG. 14 shows a chromatogram resulting from an analysis of racemic compound of tris(acetylacetonato)-chromium (III), using the packing material obtained in Example 8 according to the present invention, wherein the peak 1 denotes ʌ -form of tris(acetylacetonato)-chromium (III) and the peak 2 denotes the Δ-form thereof.

The resulting column was connected to a high performance liquid chromatograph, and ethanol was run therethrough as an eluent at a rate of 0.2 ml/min, and racemic compound of 1,1′-bi-2-naphthol was poured. A chromatogram obtained by a UV detector at 250 nm is shown in FIG. 13. It is apparent that the packing material of the present invention can effectively separate (S)-1,1′-bi-2-naphthol and (R)-1,1′-bi-2-naphthol even if the eluent is an organic solvent not containing water.

EXAMPLE 9

Figure 14:
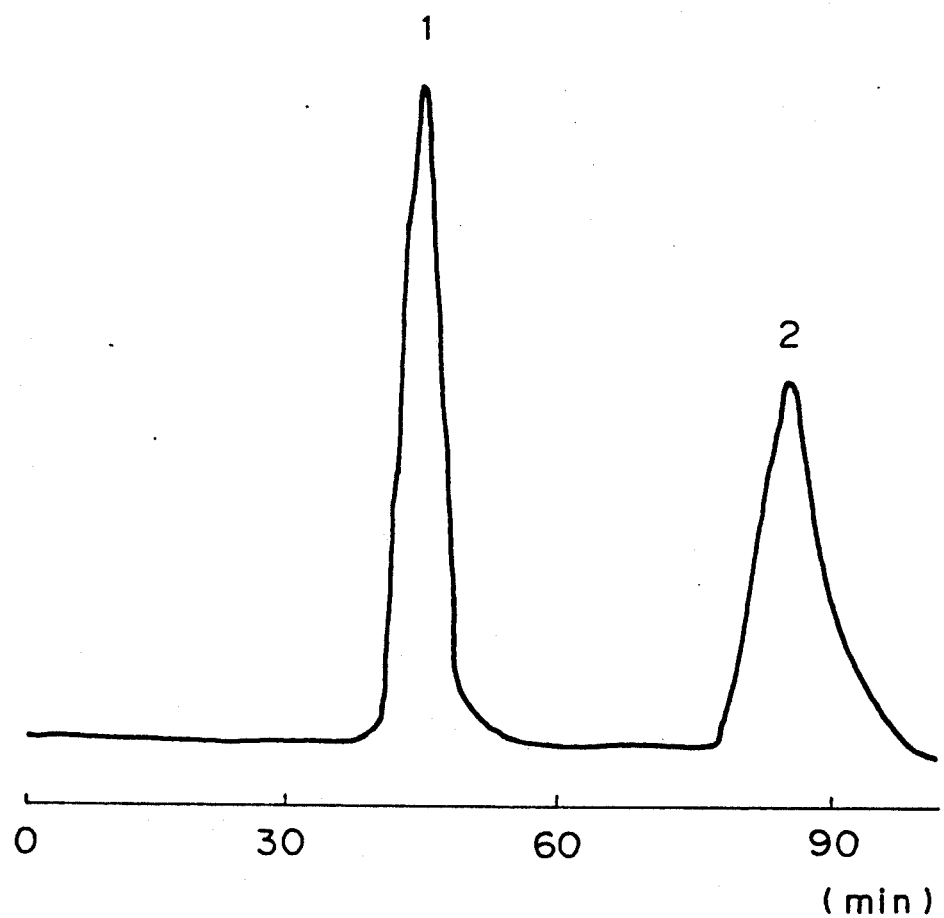

Using the column of Example 8, racemic compound of tris(acetylacetonato)chromium (III) was separated under the same conditions as in Example 8. The resulting chromatogram is shown in FIG. 8. FIG. 14 shows that the -form and Δ-form were effectively separated.

Although the present invention has been described with reference to specific embodiments, various changes and modifications obvious to those skilled in the art are deemed to be within the spirit, scope and concept of the invention.

We claim:

1. A vessel containing a spherical adsorbent sized and dimensioned for chromatographic separation comprising a natural or synthetic layered silicate mineral which upon swelling in water becomes a uniform gel, the adsorbent having been produced by dispersing the mineral in an aqueous medium, and then spray drying the resulting dispersion, the mineral having a specific surface area of at least about 100 m$^2$/g and having foreign cations substituted for interlayer ions.

2. A vessel according to claim 1, wherein the mineral comprises a calcined product.

3. A vessel according to claim 1, wherein the adsorbent is produced by dispersing a clay mineral in an aqueous medium, spray drying the resulting dispersion, dispersing the resulting powder in a solution containing a foreign cation in an aqueous or organic solvent, and then separating and drying the treated powder.

4. A vessel according to claim 3, wherein the dried powder is calcined.

5. A vessel according to claim 3, wherein the foreign cation is a metallic cation with a one, two or three valency.

6. A vessel according to claim 3, wherein the foreign cation is an organic cation.

7. A vessel according to claim 3, wherein the foreign cation is an optically active cation.

* * * * *

UNITED STATES PATENT AND TRADEMARK OFFICE
CERTIFICATE OF CORRECTION

PATENT NO. : 5,145,578
DATED : September 8, 1992
INVENTOR(S) : Tokubo et al.

It is certified that error appears in the above-identified patent and that said Letters Patent is hereby corrected as shown below:

Title Page   [75] Inventors:  1st Inventor Delete " Kazo " and substitute -- Kazuo --

Signed and Sealed this

Fifteenth Day of March, 1994

Attest:

BRUCE LEHMAN

Attesting Officer           Commissioner of Patents and Trademarks